United States Patent
Furuki et al.

(10) Patent No.: US 10,802,528 B2
(45) Date of Patent: Oct. 13, 2020

(54) OPERATING DEVICE

(71) Applicant: ALPS ALPINE CO., LTD., Tokyo (JP)

(72) Inventors: Shigeru Furuki, Miyagi (JP); Takashi Uenomachi, Miyagi (JP); Toshio Ogawa, Tokyo (JP); Yu Igarashi, Miyagi (JP); Shunsuke Nakazawa, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 16/870,021

(22) Filed: May 8, 2020

(65) Prior Publication Data

US 2020/0264649 A1    Aug. 20, 2020

Related U.S. Application Data

(63) Continuation of application No. PCT/JP2018/036677, filed on Oct. 1, 2018.

(30) Foreign Application Priority Data

Nov. 24, 2017    (JP) ................. 2017-226214

(51) Int. Cl.
    *G05G 1/04*      (2006.01)
    *F16H 59/02*      (2006.01)
    *G05G 5/03*      (2008.04)

(52) U.S. Cl.
    CPC ........... *G05G 1/04* (2013.01); *F16H 59/0278* (2013.01); *G05G 5/03* (2013.01)

(58) Field of Classification Search
    CPC .. G05G 1/04; G05G 5/03; F16H 59/02; F16H 59/0278; F16H 2059/0295
See application file for complete search history.

(56) References Cited

U.S. PATENT DOCUMENTS 7,219,572 B2 *   5/2007   Syamoto ............. F16H 59/0204
                                                                        74/335
8,330,454 B2 *   12/2012   Furuki .................. G01D 5/145
                                                                        324/207.22
(Continued)

FOREIGN PATENT DOCUMENTS

JP      2002-144905      5/2002
JP      2015-149058      8/2015
(Continued)

OTHER PUBLICATIONS

International Search Report for PCT/JP2018/036677 dated Dec. 25, 2018.

*Primary Examiner* — Adam D Rogers
(74) *Attorney, Agent, or Firm* — IPUSA, PLLC

(57) ABSTRACT

An operating device includes: an operation member capable of being tilted from an operation reference position; a support body supporting the operation member such that the operation member can be tilted first and second movable members each supported by the support body so as to rotate in conjunction with the tilting operation of the operation member; a first magnetic member formed of a magnetic material and provided to the first movable member; a second magnetic member fanned from a magnetic, material and provided to the second movable member; and a permanent magnet supported by the support body so as to face the first and second magnetic members in a first direction while the operation member is positioned at the operation reference position. The first magnetic member and the second magnetic member do not overlap each other seen from the first direction.

6 Claims, 15 Drawing Sheets

(56) References Cited

U.S. PATENT DOCUMENTS

| | | | |
|---|---|---|---|
| 10,088,036 B2 * | 10/2018 | Uenomachi | ............ G05G 9/047 |
| 2002/0056334 A1 | 5/2002 | Fujinuma | |
| 2018/0340607 A1 | 11/2018 | Uenomachi | |
| 2019/0248235 A1 * | 8/2019 | Igarashi | ................... G05G 5/06 |
| 2019/0285170 A1 * | 9/2019 | Igarashi | ................... G05G 5/03 |

FOREIGN PATENT DOCUMENTS

| | | | | |
|---|---|---|---|---|
| JP | 2019104423 A | * | 6/2019 | |
| WO | 2017/138429 | | 8/2017 | |
| WO | 2017/195432 | | 11/2017 | |
| WO | WO-2017195432 A1 | * | 11/2017 | ............... G05G 5/03 |
| WO | WO-2019009102 A1 | * | 1/2019 | ............. B60K 20/02 |
| WO | WO-2019013048 A1 | * | 1/2019 | ............. B60K 20/02 |
| WO | WO-2019135307 A1 | * | 7/2019 | ................. G05G 5/03 |

\* cited by examiner

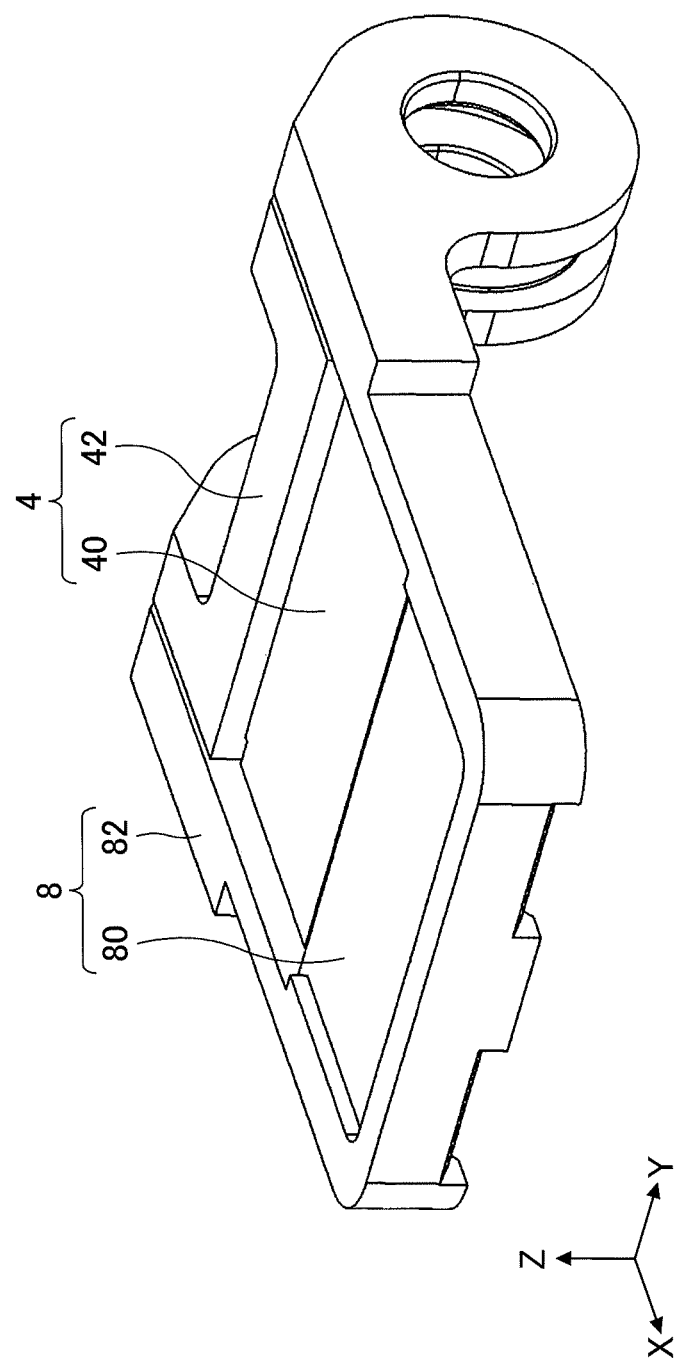

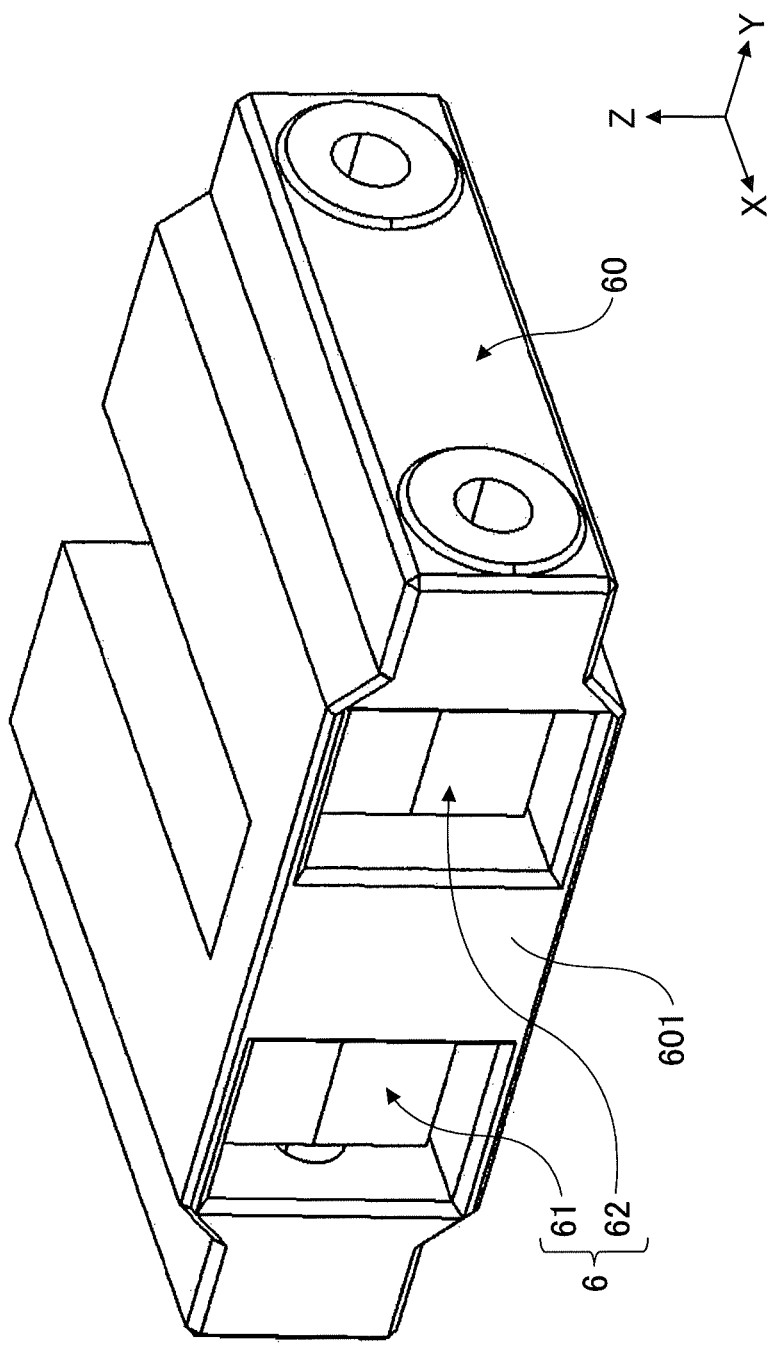

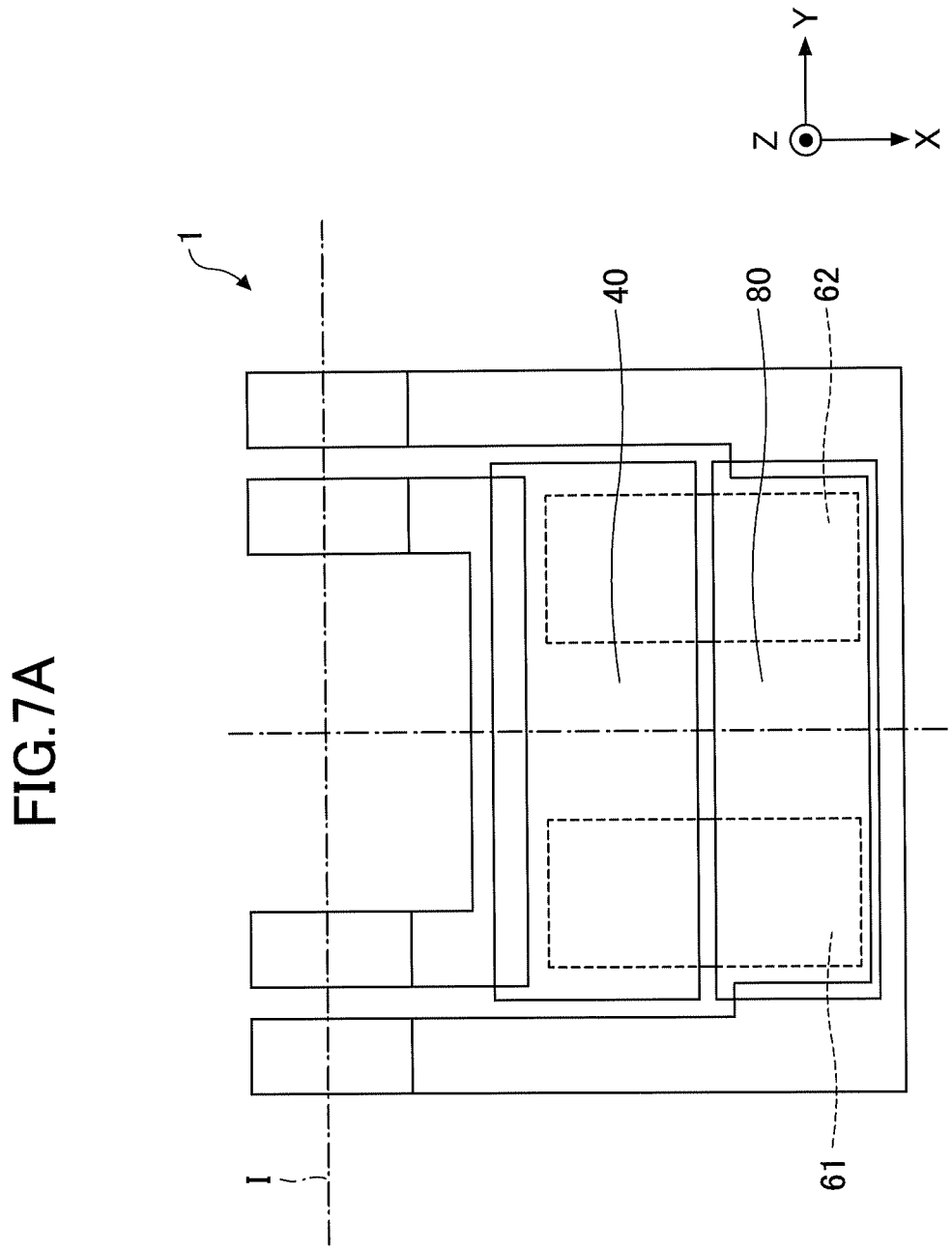

US 10,802,528 B2

OPERATING DEVICE

CROSS-REFERENCE TO RELATED APPLICATIONS

This application is a continuation of International Application No. PCT/JP2018/036677 filed on Oct. 1, 2018 and designated the U.S., which claims priority to Japanese Patent Application No. 2017-226214 filed on Nov. 24, 2017. The contents of these applications are incorporated herein by reference in their entirety.

TECHNICAL FIELD

The present disclosure relates to an operating device.

BACKGROUND OF THE INVENTION

There is known a control device that utilizes a cam mechanism to generate a click feeling to be transmitted to a hand of a user operating the control device.

However, in the above-described conventional art, it is difficult to realize a compact and durable operating device. The configuration that uses a cam mechanism to generate a click feeling is disadvantageous from the viewpoint of durability because the cam mechanism involves mechanical sliding. In addition, the configuration that uses a cam mechanism to generate a click feeling requires that an actuator is energized on a sliding portion by a spring, which is disadvantageous from the viewpoint of downscaling.

RELATED ART DOCUMENT

Patent Document

[Patent Document 1] Japanese Laid-open Patent Publication No. 2002-144905

SUMMARY OF THE INVENTION

In one aspect, there is provision of an operating device including an operation member that can be tilted from an operation reference position; a support body supporting the operation member such that the operation member can be tilted; a first movable member supported by the support body so as to rotate in conjunction with a tilting operation of the operation member; a second movable member supported by the support body so as to rotate in conjunction with the tilting operation of the operation member; a first magnetic member formed of a magnetic material and provided to the first movable member; a second magnetic body formed of a magnetic material and provided to the second movable member; and a permanent magnet supported by the support body so as to face the first magnetic member and the second magnetic member in a first direction in a state in which the operation member is positioned at the operation reference position. The first magnetic member and the second magnetic member do not overlap with each other seen from the first direction.

BRIEF DESCRIPTION OF THE DRAWINGS

FIG. 5 is a perspective view illustrating a first movable member and a second movable member above a permanent magnet;

FIG. 6 is a perspective view illustrating a magnet holder to which a first magnet and a second magnet are mounted;

FIG. 7A is an explanatory view of a principle of attractive force generation by an attractive force generating mechanism according to the first embodiment;

DETAILED DESCRIPTION OF THE PREFERRED EMBODIMENTS

Hereinafter, each embodiment will be described in detail with reference to the accompanying drawings.

First Embodiment

Figure 1:
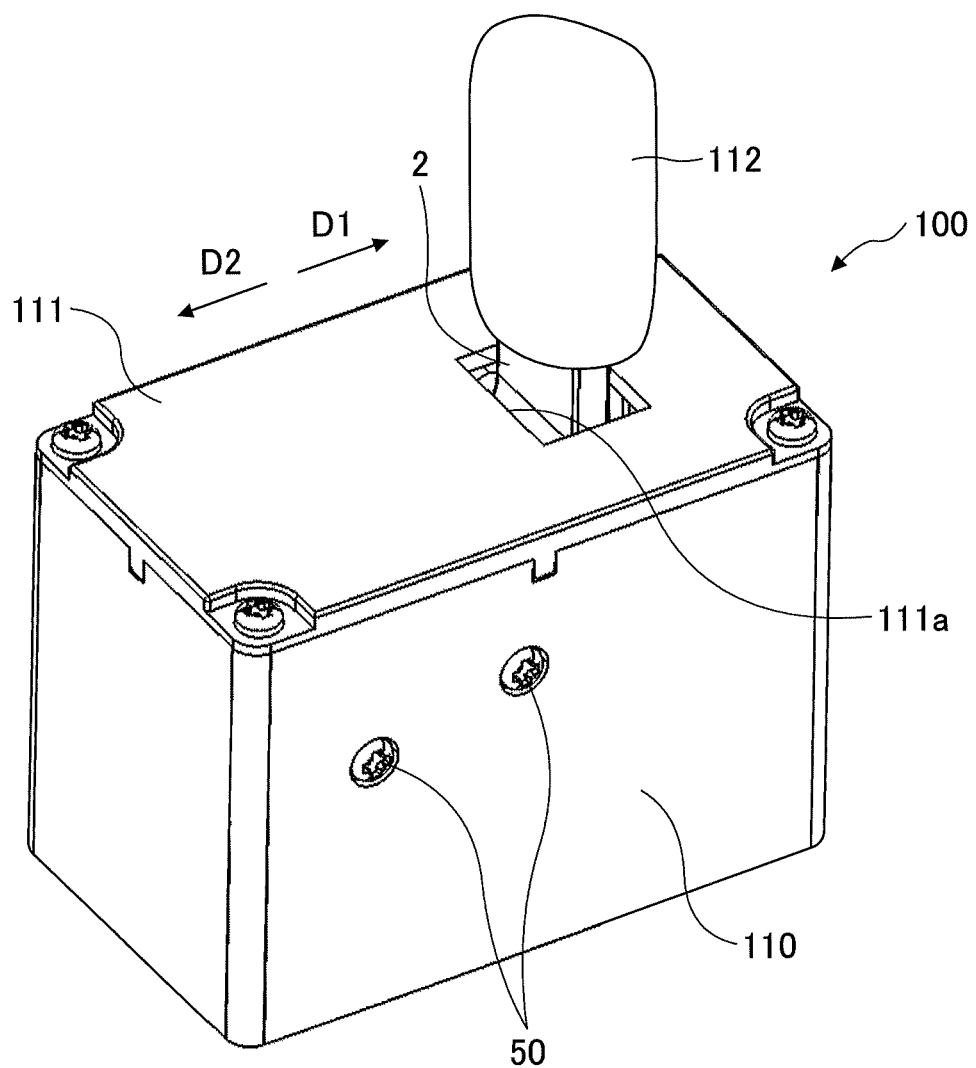
FIG. 1 is an external perspective view of a shift device according to a first embodiment.
Figure 2:
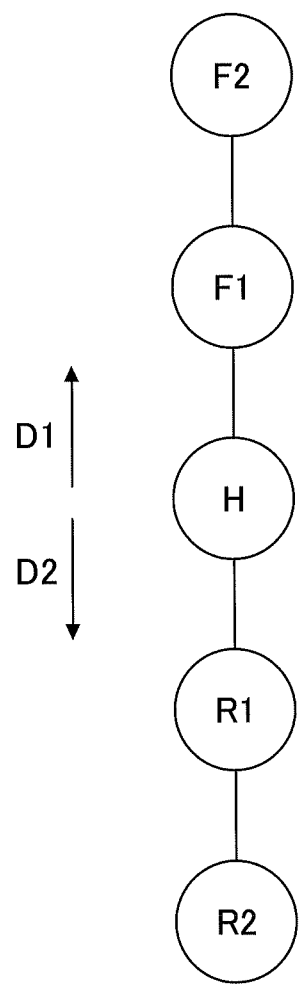
FIG. 2 is an explanatory diagram illustrating an example of shift operations of the shift device according to the first embodiment.
Figure 3:
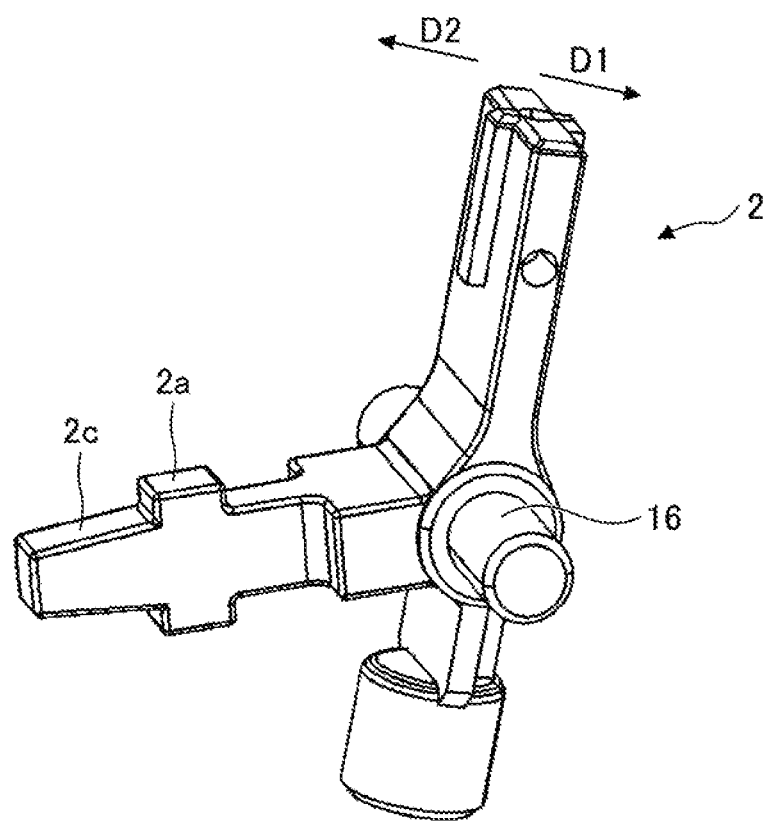
FIG. 3 is a perspective view of an operation lever, which is illustrated in a state of a single component.

FIG. 1 is an external perspective view of a shift device 100 (an example of an operating device) according to a first embodiment. FIG. 2 is an explanatory diagram illustrating an example of shift operations of the shift device 100. FIG. 3 is a perspective view of an operation lever 2 (an example of an operation member), which is in in a state of a single component. In FIG. 1, illustration of a part of the operation lever 2 (shift knob 112) is simplified. In FIG. 1, two tilting directions D1 and D2 of the operation lever 2 are illustrated. In FIG. 3, the shift knob 112 is not illustrated for visibility purposes.

The shift device 100 is preferably provided on a vehicle. However, the shift device 100 may be provided in an aircraft, a railway car, or the like, or may be applied to a game machine.

The shift device 100 includes the operation lever 2 that can be tilted from a home position H (see FIG. 2; the home position H is an example of an operation reference position), a case body 110 (an example of a support body) that supports the operation lever 2 such that the operation lever 2 can be tilted, and a cover 111 that covers an open portion on the upper side of the case body 110. The case body 110 accommodates an attractive force generating mechanism 1 to be described below. Note that the case body 110 is formed by injection molding a resinous material such as polybutylene terephthalate.

A proximal end of the operation lever 2 is integrally attached to a tilting shaft 16. In the first embodiment, for example, both ends of the tilting shaft 16 are rotatably supported to a bearing section (not illustrated) provided on the sides of the case body 110. Thus, the operation lever 2 is supported such that the operation lever 2 can tilt in a first tilting direction (D1 direction) or a second tilting direction (D2 direction) with respect to the case body 110.

The cover 111 is molded from a resin such as polybutylene terephthalate (PBT), as well as the case body 110. A through-hole 111a is formed in a central portion of the cover 111, through which the operation lever 2 is inserted and a tip of the operation lever 2 is projected with respect to the top surface of the cover. The shift knob 112 that is gripped by a user when tilting the operation lever 2 is attached to an extreme end of the operation lever 2.

The shift device 100 is a shift-by-wire system, not a machine control system in which the operation lever 2 is directly connected to a gearbox. Because the shift device 100 of the shift-by-wire system does not require a mechanical structure such as a link mechanism, downscaling is achieved. Accordingly, a layout of the shift device 100 within the vehicle can have flexibility. Further, because the operation lever 2 can be operated with relatively small force, operations of shifting gears become easier.

When the operation lever 2 is operated to be tilted from the home position H to the first tilting direction (D1 direction), the operation lever 2 is moved to a position F1. The position F1 is a first position F1 in the first tilting direction (D1 direction). When the operation lever 2 is further operated to be tilted from the first position F1 to the first tilting direction (D1 direction), the operation lever 2 is moved to a position F2. The position F2 is the second position F2 in the first tilting direction (D1 direction).

When the operation to tilt the operation lever 2 to the first position F1 or the second position F2 in the first tilting direction (D1 direction) is released, the operation lever 2 is automatically tilted toward the second tilting direction (D2 direction), and the operation lever 2 is returned to the position H. At that time, a shift state of the vehicle is maintained at F1 or F2.

When the operation lever 2 is operated to be tilted from the home position H to the second tilting direction (D2 direction), the operation lever 2 is moved to a position R1. The position R1 is a first position R1 in the second tilting direction (D2 direction). When the operation lever 2 is further operated to be tilted from the first position R1 to the second tilting direction (D2 direction), the operation lever 2 is moved to a position R2. The position R2 is a second position R2 in the second tilting direction (D2 direction).

When the operation to tilt the operation lever 2 to the first position R1 or the second position R2 in the second tilting direction (D2 direction) is released, the operation lever 2 is automatically tilted toward the first tilting direction (D1 direction), and the operation lever 2 is returned to the position H. At that time, the shift state of the vehicle is maintained at the R1 or R2 state.

Figure 4:
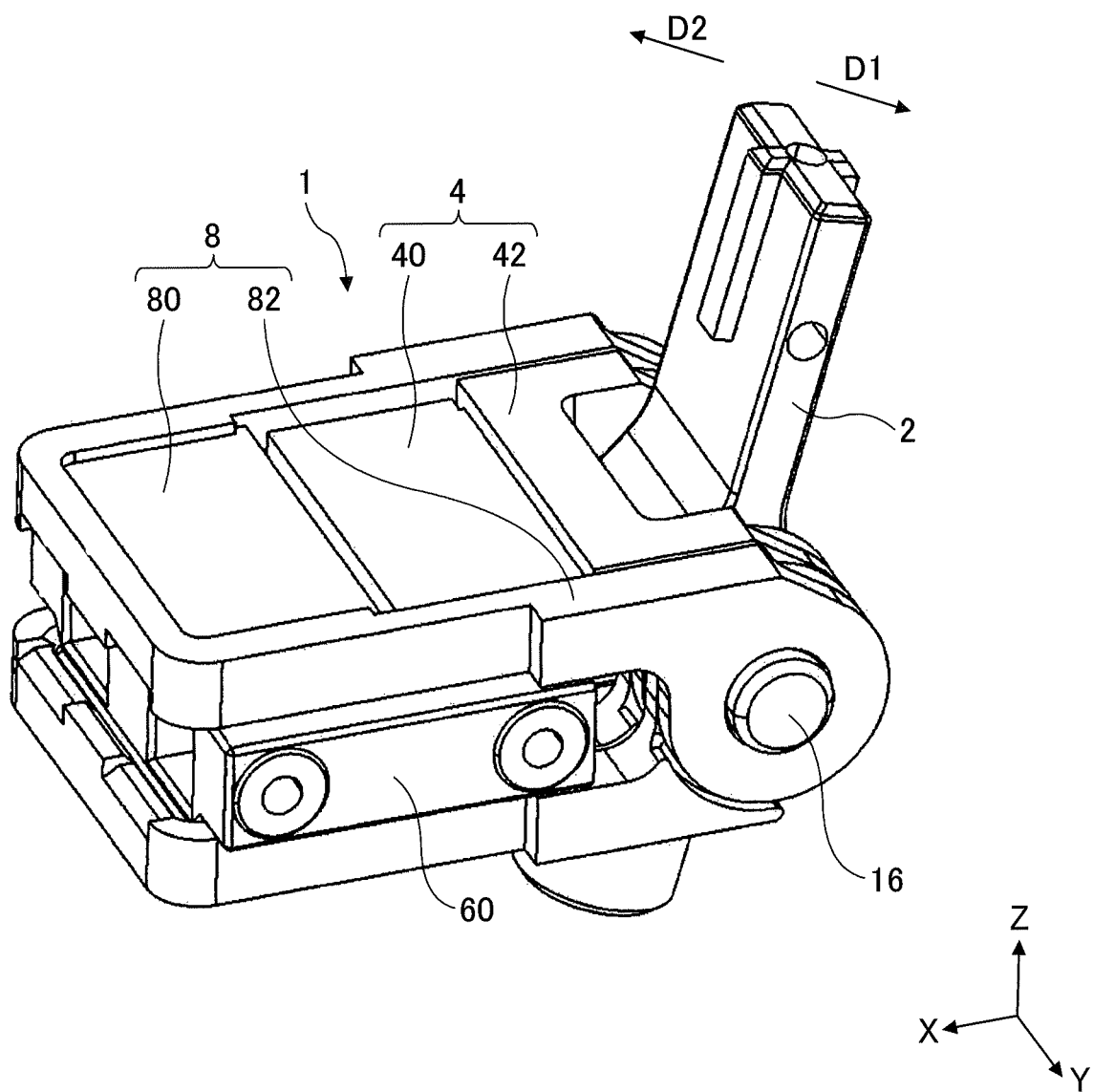
FIG. 4 is a perspective view illustrating a state in which a cover and a case body of the shift device of FIG. 1 are removed.

FIG. 4 is a perspective view illustrating a state in which the cover 111 and the case body 110 of the shift device 100 of FIG. 1 are removed. FIG. 5 is a perspective view illustrating a first movable member 4 and a second movable member 8, which are above the permanent magnet 6. FIG. 6 is a perspective view illustrating a magnet holder 60 to which a first magnet 61 and a second magnet 62 are mounted. In FIG. 4, the shift knob 112 is not illustrated for visibility purposes. In FIG. 4, orthogonal three axes X, Y, and Z are defined. The Z direction corresponds to a direction perpendicular to an extending plane of the magnet holder 60, and a positive side corresponds to the "upper side". Note that, in a state in which the shift device 100 is installed, the Z direction is not required to be parallel to a gravity direction.

The shift device 100 includes the attractive force generating mechanism 1.

The attractive force generating mechanism 1 includes first movable members 4, a permanent magnet 6, second movable members 8, first magnetic members 40 provided in the respective first movable members 4, and second magnetic members 80 provided in the respective second movable members 8.

The first movable members 4 and the second movable members 8 are provided on both sides of the magnet holder 60 (and the permanent magnet 6 held therein) in the Z direction. The first movable member 4 and the second movable member 8 provided above the permanent magnet 6 cooperate with the permanent magnet 6 to generate a two-stage click feeling in response to a tilting operation of the operation lever 2 to the first tilting direction (D1 direction). The first movable member 4 and the second movable member 8 provided below the permanent magnet 6 cooperate with the permanent magnet 6 to generate a two-stage click feeling in response to a tilting operation of the operation lever 2 to the second tilting direction (D2 direction). The first movable members 4 are symmetrical with respect to an XY plane passing through the center of the permanent magnet 6 in the Z-direction, and the second movable members 8 are symmetrical with respect to the XY plane passing through the center of the permanent magnet 6 in the Z-direction. Thus, in the following, the first movable member 4 and the second movable member 8 provided above the permanent magnet 6 (see FIG. 5) will be described, unless otherwise stated.

The first movable member 4 includes a set of a mounting piece 42 and a first magnetic member 40, which are rotatably supported by the tilting shaft 16. The mounting piece 42 is formed of, for example, a resin material. In this case, the mounting piece 42 and the first magnetic member 40 may be integrally formed by insert molding. However, in an alternative embodiment, the mounting piece 42 may be formed of a magnetic material.

The first movable member 4 is supported by the case body 110 so as to rotate in conjunction with the tilting operation of the operation lever 2. For example, the first movable member 4 is rotatably supported by the tilting shaft 16 of the operation lever 2. There may be various ways of operating the first movable member 4 in conjunction with the operation lever 2. In the first embodiment, as an example, the operation lever 2 has a protruding portion 2a protruding upward, which abuts a lower surface of the first movable member 4 as illustrated in FIG. 3. When the operation lever 2 is tilted to the first tilting direction (D1 direction), the protruding portion 2a abuts the first movable member 4. When the operation lever 2 is further tilted to the first tilting direction (D1 direction) while the protruding portion 2a is in contact with the first movable member 4, the first movable member 4 rotates about the tilting shaft 16.

The permanent magnet 6 is supported by the case body 110 such that the permanent magnet 6 faces the first magnetic member 40 and the second magnetic member 80 in the Z direction (an example of a first direction) when the operation lever 2 is positioned at the home position H.

In the first embodiment, for example, the permanent magnet 6 is accommodated in the magnet holder 60. The magnet holder 60 is secured to the case body 110 by screws 50 (see FIG. 1). The magnet holder 60 is disposed between the first movable members 4 and the second movable members 8 in the Z direction.

In the permanent magnet 6, adjacent polarities are different in the Y direction (an example of a second direction) intersecting with the Z direction. In the first embodiment, for example, the permanent magnet 6 includes the first magnet 61 and the second magnet 62. The first magnet 61 and the second magnet 62 are arranged side by side in the Y direction such that a direction of magnetism of the first magnet 61 differs from a direction of magnetism of the second magnet 62 in the Z direction. That is, the first magnet 61 and the second magnet 62 are arranged in the Y direction such that orientations of magnetization in the Z direction of the first magnet 61 and the second magnet 62 are opposite. For example, an upper side of the first magnet 61 is the north magnetic pole, and an upper side of the second magnet 62 is the south magnetic pole, so that magnetism of the first magnet 61 and magnetism of the second magnet 62 are different from each other in the Z direction. The first magnet 61 and the second magnet 62 extend in the X direction longitudinally as illustrated in FIG. 6. The first magnet 61 and the second magnet 62 extend in the X direction in a manner facing the first magnetic member 40 and the second magnetic member 80. The first magnet 61 and the second magnet 62 are adjacent in the Y direction via a separation section 601 of the magnet holder 60. In this case, because the first magnet 61 and the second magnet 62 attract each other via the separation section 601, fixing by a fixing device to the magnet holder 60 or the like can be eliminated.

The second movable member 8 includes a set of a mounting piece 82 and a second magnetic member 80, which are rotatably supported by the tilting shaft 16. For example, the mounting piece 82 is formed of a resin material. In this case, the mounting piece 82 and the second magnetic member 80 may be integrally formed by insert molding. However, in an alternative embodiment, the mounting piece 82 may be formed of a magnetic material.

The second movable member 8 is supported by the case body 110 so as to rotate in conjunction with the tilting operation of the operation lever 2. For example, the second movable member 8 is rotatably supported by the tilting shaft 16 of the operation lever 2. There may be various ways of operating the second movable member 8 in conjunction with the operation lever 2. In the first embodiment, as an example, the operation lever 2 has an upper surface 2c that abuts the lower surface of the second movable member 8 as illustrated in FIG. 3. When the operation lever 2 is tilted in the first tilting direction (D1 direction), the upper surface 2c abuts the second movable member 8. When the operation lever 2 is further tilted in the first tilting direction (D1 direction) while the upper surface 2c is in contact with the second movable member 8, the second movable member 8 rotates about the tilting shaft 16.

The second magnetic member 80 is provided adjacent to the first magnetic member 40 in the X direction. Specifically, the second magnetic member 80 is disposed on a positive side (a side farther from the tilting shaft 16) in the X direction relative to the first magnetic member 40. The second magnetic member 80 may preferably extend in the same plane (XY plane) as the first magnetic member 40 in an area facing the permanent magnet 6, from the viewpoint of making the attractive force generating mechanism 1 thinner (and the resulting downsizing of the shift device 100). The meaning of "in the same plane" described above may be a state in which the first magnetic member 40 is not offset from the second magnetic member 80 greater than a plate thickness in the Z direction, and it does not require that the first magnetic member 40 and the second magnetic member 80 are exactly in the same plane. However, in an alternative embodiment, the first magnetic member 40 and the second magnetic member 80 may be offset in the Z direction by the plate thickness or more.

Next, a principle of attractive force generation (click feeling generation) by the attractive force generating mechanism 1 will be outlined. In the attractive force generating mechanism 1, the permanent magnet 6 cooperates with the first magnetic member 40 of the first movable member 4 and the second magnetic member 80 of the second movable member 8, to generate a click feeling by magnetic force.

Figure 7B:
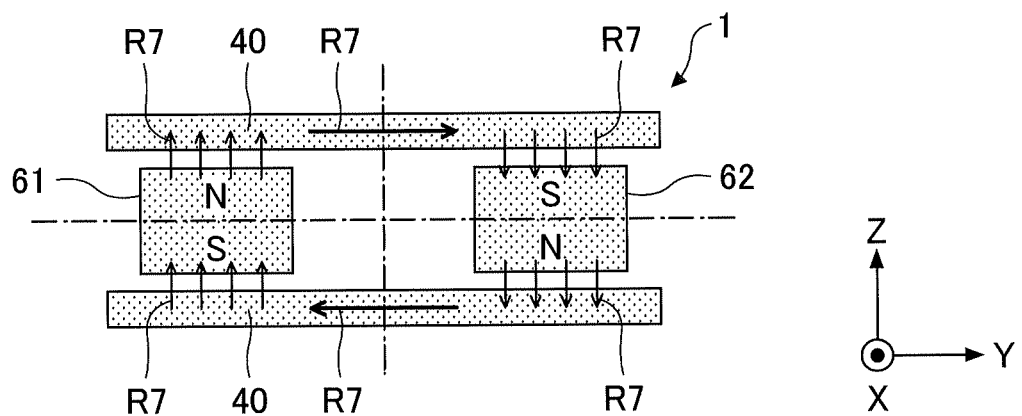
FIG. 7B is an explanatory view of the principle of attractive force generation by the attractive force generating mechanism according to the first embodiment.
Figure 7C:
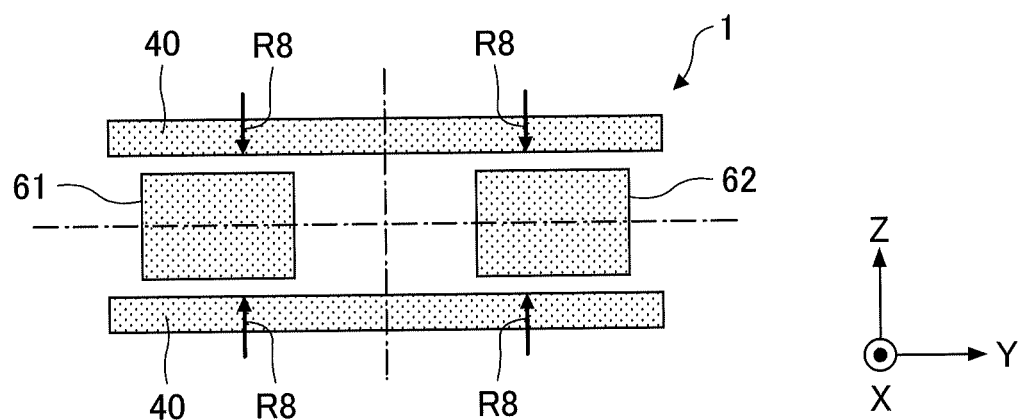
FIG. 7C is an explanatory view of the principle of attractive force generation by the attractive force generating mechanism according to the first embodiment.
Figure 8A:
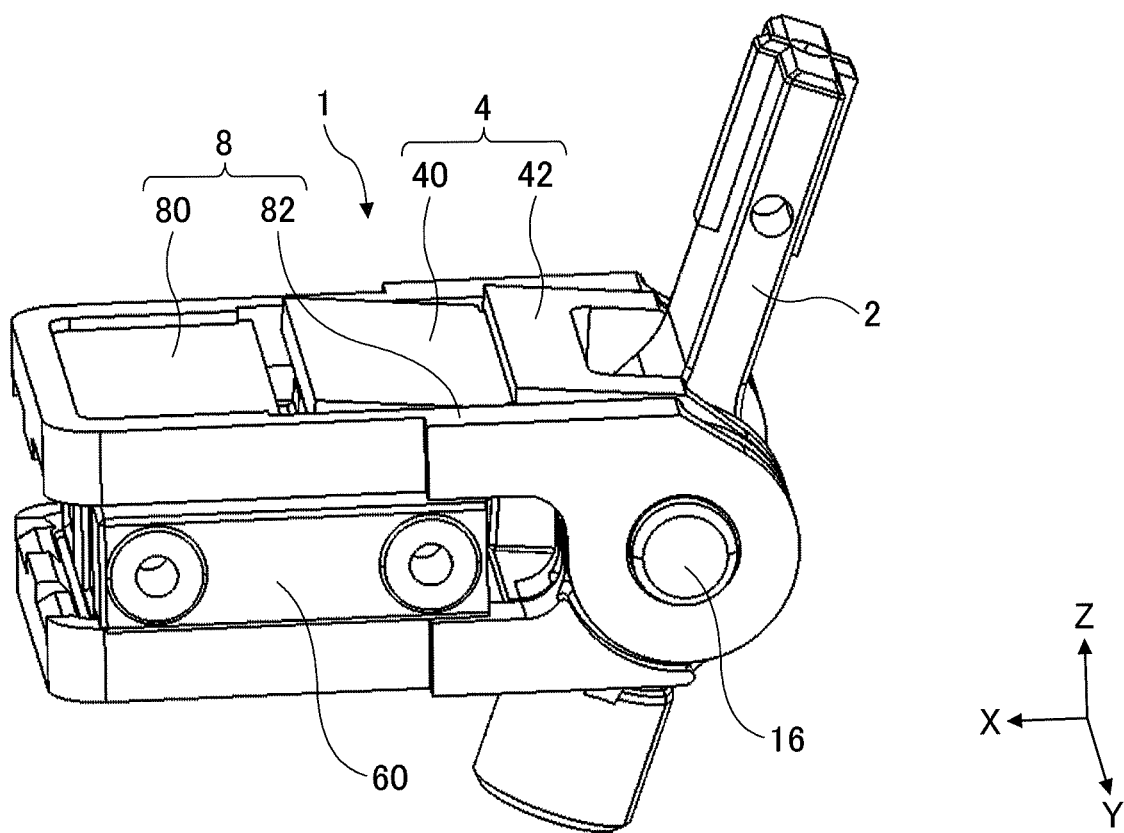
FIG. 8A is a perspective view illustrating a state in which a first magnetic member is rotated integrally with the first movable member in a direction away from the magnet holder (first stage)
Figure 8B:
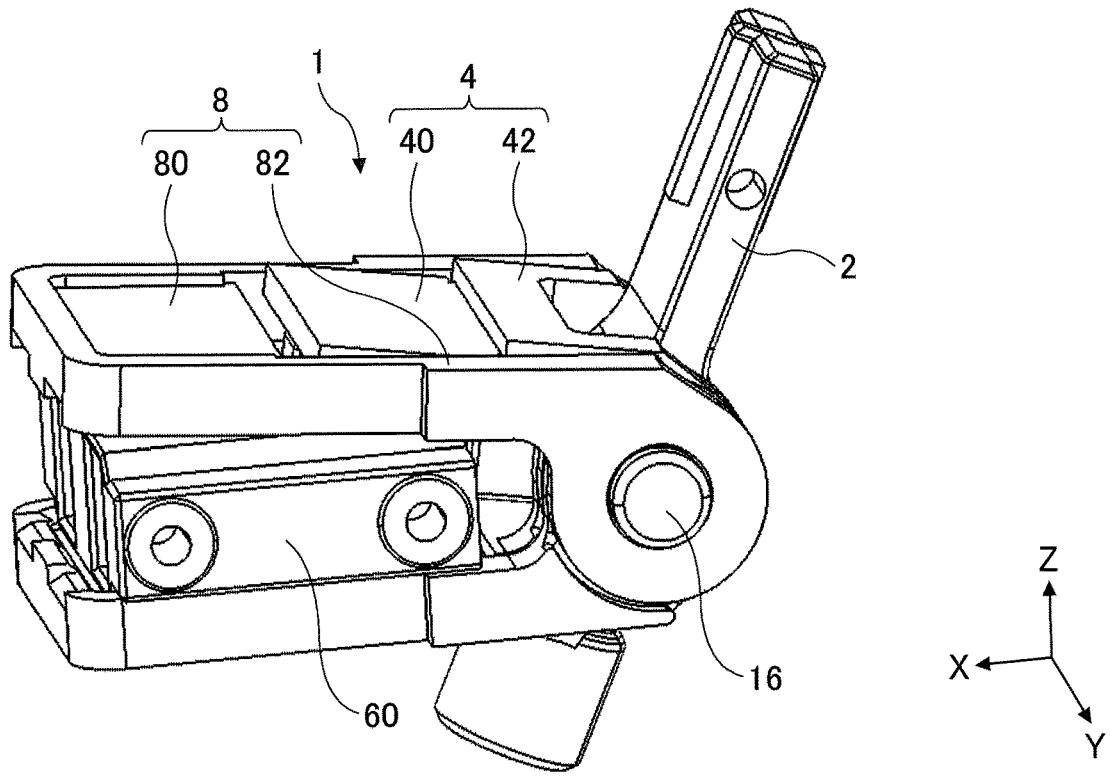
FIG. 8B is a perspective view illustrating a state in which a second magnetic member is rotated integrally with the second movable member in the direction away from the magnet holder (second stage)

FIGS. 7A to 7C are explanatory views of the principle of attractive force generation by the attractive force generating mechanism 1. FIG. 7A is a plan view, and FIGS. 7B and 7C are cross-sectional views taken along a YZ plane passing through the first magnetic members 40. As FIGS. 7A to 7C are explanatory views, illustration of the magnet holder 60 and the like is omitted. In FIG. 7A, an axis I of the tilting shaft 16 is schematically illustrated. Also, in FIG. 7B, a flow of magnetic flux is schematically illustrated by arrows R7, and in FIG. 7C, attractive force is schematically illustrated by arrows R8. FIG. 8A is a perspective view illustrating a state in which the first magnetic member 40 is rotated integrally with the first movable member 4 in a direction away from the magnet holder 60. FIG. 8B is a perspective view illustrating a state in which the first magnetic member 40 and the second magnetic member 80 are rotated integrally with the first movable member 4 and the second movable member 8 respectively, in the direction away from the magnet holder 60.

In FIG. 7B, for example, the upper side of the first magnet 61 is a north magnetic pole, and the upper side of the second magnet 62 is a south magnetic pole. In this case, a flow of magnetic flux occurs as indicated by the arrows R7 in FIG. 7B, and as illustrated by an arrow R8 in FIG. 7C, attractive force is generated in the Z direction between the first magnetic members 40 and the first magnet 61 and between the first magnetic members 40 and the second magnet 62.

Further, the flow of the magnetic flux and the attracting force that occur between the first magnetic members 40 and the first and second magnets 61 and 62 and the flow of the magnetic flux and the attracting force that occur between the second magnetic members 80 and the first and second magnets 61 and 62 are substantially independent of each other. Incidentally, in FIGS. 7B and 7C, the flow of the magnetic flux and the attractive force with respect to the first magnetic members 40 are illustrated. However, the flow of the magnetic flux and the attractive force with respect to the second magnetic member 80 are similar to that illustrated in FIGS. 7B and 7C.

In a process in which the operation lever 2 is tilted to the first tilting direction (D1 direction) from the home position H, after the protruding portion 2a of the operation lever 2 abuts the first movable member 4, when the first magnetic member 40 is rotated integrally with the first movable member 4 in the direction away from the magnet holder 60 against the attractive force from the first and second magnets 61 and 62 (see FIG. 8A), the first magnetic member 40 is pulled away from the first magnet 61 and the second magnet 62, thereby generating a click feeling. Further, after the upper surface 2c of the operation lever 2 abuts the second movable member 8, when the second magnetic member 80 is rotated integrally with the second movable member 8 in the direction away from the magnet holder 60 against the attractive force from the first magnet 61 and the second magnet 62 (see FIG. 8B), the second magnetic member 80 is pulled away from the first magnet 61 and the second magnet 62, thereby generating a click feeling.

Note that the operation lever 2, the first movable member 4, and the second movable member 8 are configured such that the upper surface 2c abuts the second movable member 8 after the protruding portion 2a abuts the first movable member 4, in the process in which the operation lever 2 is tilted toward the first tilting direction (D1 direction) from the home position H. This creates click feelings at different tilting operation positions (a click feeling is generated at each stage of the first position F1 and the second position F2 in the D1 direction).

In the first embodiment, as illustrated in FIG. 7A, the first magnetic member 40 and the second magnetic member 80 do not overlap seen from the Z direction. Therefore, according to the first embodiment, compared to a comparative example (not illustrated) in which the first magnetic member and the second magnetic member overlap with each other seen from the Z direction, the flow of magnetic flux occurring in each of the first magnetic member 40 and the second magnetic member 80, and each area of the first magnetic member 40 and the second magnetic member 80 facing the first magnet 61 and the second magnet 62 (area seen from the Z direction) are clarified. As a result, a design of the attractive force becomes easier, and an individual difference can be reduced.

As described above, according to the first embodiment, because the attractive force generating mechanism 1 generates a click feeling, it is easier to downsize and improve durability as compared to a configuration in which a cam mechanism is used to create a click feeling. Further, according to the first embodiment, as the first magnetic member 40 and the second magnetic member 80 are arranged so that they do not overlap seen from the Z direction, the design of the attractive force is made to be easy and an individual difference can be reduced.

In the first embodiment, the first magnet 61 and the second magnet 62 extend in the X direction in a manner facing the first magnetic member 40 and the second magnetic member 80, but are not limited thereto. The first magnet 61 may be provided for each of the first magnetic member 40 and the second magnetic member 80, and the second magnet 62 may be provided for each of the first magnetic member 40 and the second magnetic member 80.

Further, in the first embodiment, two magnets of the first magnet 61 and the second magnet 62 are provided, but a single magnet having the same polarity (a multipole magnet) may be used. However, in a case in which the first magnet 61 and the second magnet 62 are used, multipolarization is not required and cost can be reduced.

In the first embodiment, the first movable members 4 and the second movable members 8 are disposed on both sides of the permanent magnet 6 in the Z direction, but are not limited thereto. For example, in FIG. 2, in the configuration in which position R1 and position R2 are not provided, a first movable member 4 and a second movable member 8 may be provided on only one side, to provide the first and second positions F1 and F2. In this case, the first movable member 4 and the second movable member 8 may be provided on one side of the permanent magnet 6 in the Z direction, and a non-movable member formed of a magnetic material may be provided on the other side of the permanent magnet 6 in the Z direction (see second embodiment below). Because the non-movable member can realize the flow of magnetic flux as illustrated in FIG. 7B in a similar manner to the first magnetic member and the second magnetic member, a click feeling can be generated based on the same principle.

Second Embodiment

A shift device (an entirety of which is not illustrated) according to a second embodiment differs from the shift device 100 according to the above-described first embodiment in that an operation lever 2A is tilted only to one side (D1) and the attractive force generating mechanism 1 in the first embodiment is replaced by an attractive force generating mechanism 1A. In the second embodiment, with respect to components that may be the same as those in the above-described first embodiment, the same reference numerals are attached, and descriptions of the components are omitted.

Figure 9:
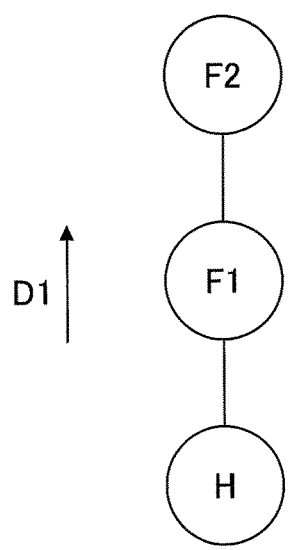
FIG. 9 is an explanatory diagram illustrating an example of shift operations of a shift device according to a second embodiment.

FIG. 9 is an explanatory diagram illustrating an example of shift operations of the shift device according to the second embodiment. The shift device according to the second embodiment differs from the shift device 100 according to the first embodiment in that a tilting direction of the operation lever 2A is only one side (D1). However, the second embodiment is also applicable to a configuration in which the tilting direction of the operation lever 2A is two tilting directions, similar to the above-described first embodiment. In other words, the tilting direction of the operation lever 2A may be at least one direction, and the operation lever 2A may be provided with two or more lever positions. The same shall apply to the above-described first embodiment.

Figure 10:
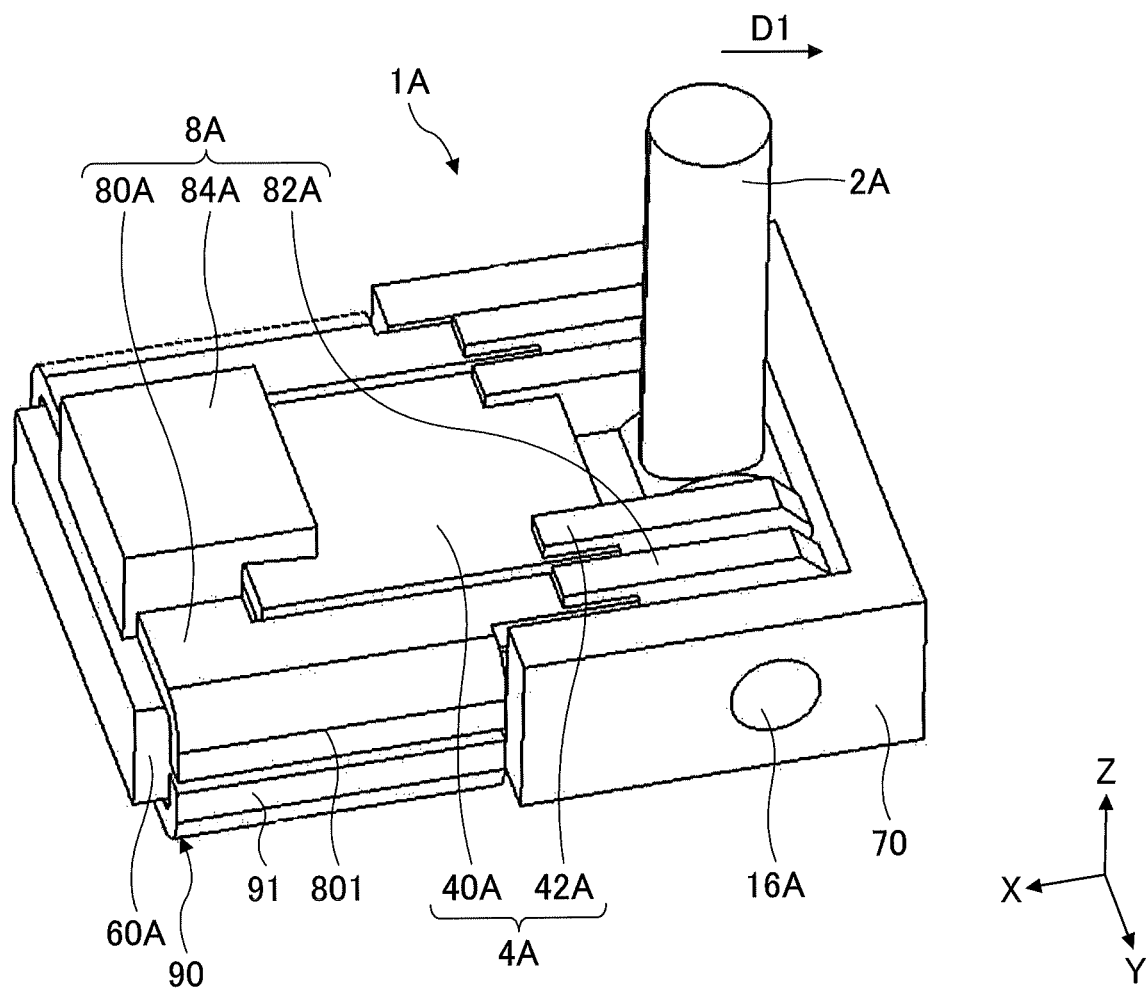
FIG. 10 is a perspective view of an attractive force generating mechanism according to the second embodiment.
Figure 11:
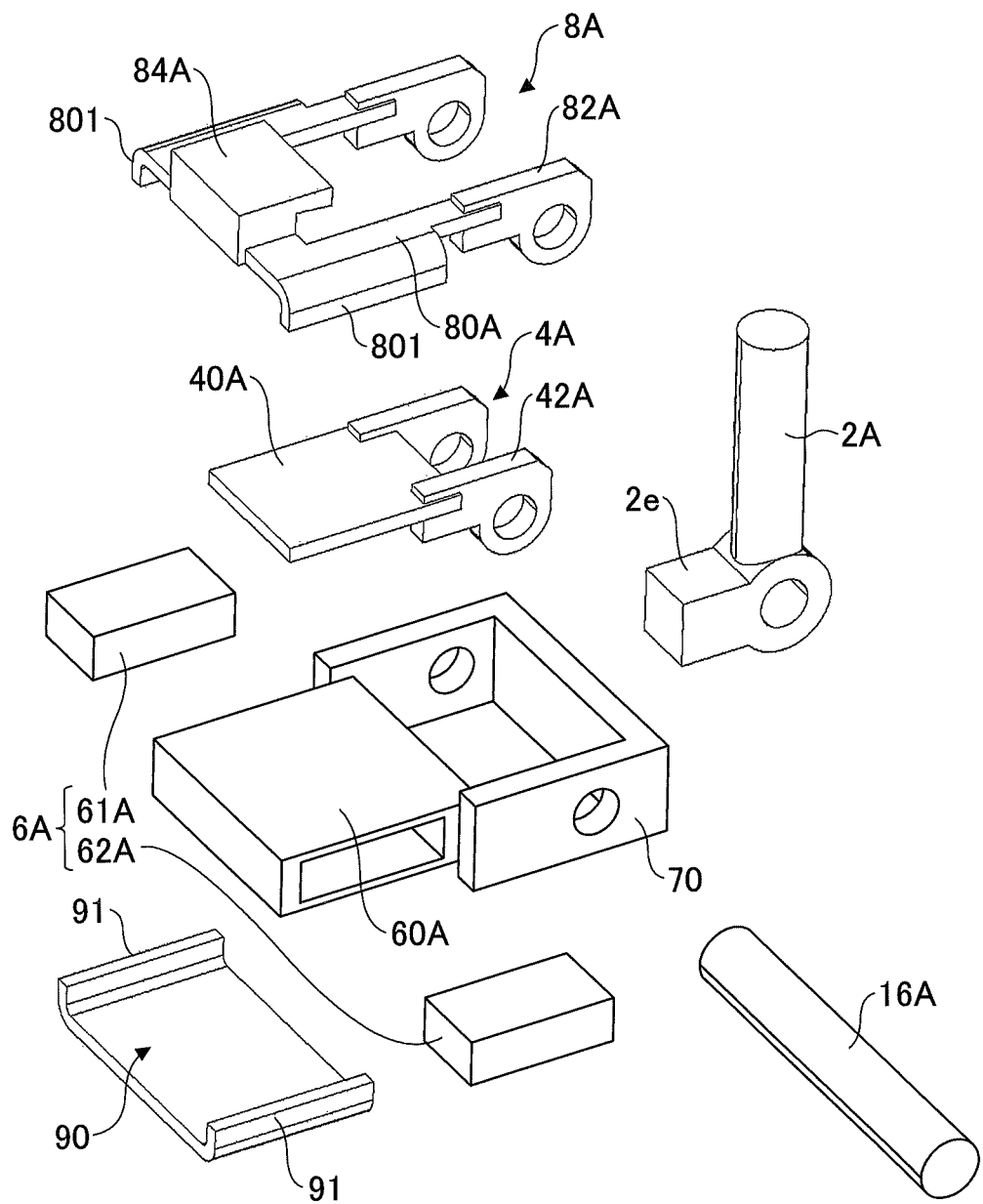
FIG. 11 is an exploded perspective view of the attractive force generating mechanism.

FIG. 10 is a perspective view of the attractive force generating mechanism 1A according to the second embodiment, which illustrates a state in which the cover 111 and the case body 110 of the shift device according to the second embodiment are removed. In FIG. 10, a portion (shift knob) of the operation lever 2A is simplified. In FIG. 10, a tilting direction D1 of the operation lever 2A is illustrated. FIG. 11 is an exploded perspective view of the attractive force generating mechanism 1A.

In FIG. 10, orthogonal three axes X, Y, and Z are defined. The Z direction corresponds to a direction perpendicular to a plane in which a magnet holder 60A extends, and a positive side corresponds to an "upper side". In a state in which the shift device according to the second embodiment is installed, the Z direction is not necessarily parallel to a gravity direction.

In the second embodiment, for example, a proximal end of the operation lever 2A is rotatably attached to a tilting shaft 16A. The tilting shaft 16A is secured to a frame 70 (an example of a support body). Thus, the operation lever 2A is supported to the frame 70 such that the operation lever 2A can be tilted to the first tilting direction (the D1 direction). However, in the second embodiment, the proximal end of the operation lever 2A may be integrally attached to the tilting shaft 16A, similar to the above-described first embodiment. The frame 70 may be fixed to the case body 110, or may be supported such that, for example, the frame 70 is rotatable about an axis parallel to the X direction.

The attractive force generating mechanism 1A includes a first movable member 4A, a permanent magnet 6A, a second movable member 8A, a first magnetic member 40A provided in the first movable member 4A, a second magnetic member 80A provided in the second movable member 8A, and a non-movable member 90.

In the second embodiment, for example, the first movable member 4A and the second movable member 8A are provided on one side (a side above the permanent magnet 6A) of the permanent magnet 6A in the Z direction. The first movable member 4A and the second movable member 8A provided above the permanent magnet 6A cooperate with the permanent magnet 6A to generate a two-stage click feeling in response to a tilting operation of the operation lever 2A to the first tilting direction (D1 direction).

However, in an alternative embodiment, the first movable members 4A and the second movable members 8A may be provided on both sides of the permanent magnet 6A in the Z direction. In this case, the first movable member 4A and the second movable member 8A provided below the permanent magnet 6A cooperate with the permanent magnet 6A to generate a two-stage click feeling in response to a tilting operation of the operation lever 2A to the second tilting direction (D2 direction). Because each of the first movable members 4A and each of the second movable members 8A are symmetrical with respect to the XY plane passing through the center of the permanent magnet 6A in the Z-direction, the first movable member 4A and the second movable member 8A above the permanent magnet 6A will be described in the following description, unless otherwise noted.

The first movable member 4A includes a set of a mounting piece 42A and a first magnetic member 40A, which are rotatably supported by the tilting shaft 16A. For example, the mounting piece 42A is formed of a resin material. In this case, the mounting piece 42A and the first magnetic member 40A may be integrally formed by insert molding. However, in an alternative embodiment, the mounting piece 42A may be formed of a magnetic material.

The first movable member 4A is supported by the frame 70 so as to rotate in conjunction with the tilting operation of the operation lever 2A. For example, the first movable member 4A is rotatably supported by the tilting shaft 16A of the operation lever 2A. There may be various ways of operating the first movable member 4A in conjunction with the operation lever 2A. In the second embodiment, as an example, the operation lever 2A includes an upper surface 2e that abuts the lower surface of the first movable member 4A, similar to the first embodiment described above. When the operation lever 2A is tilted to the first tilting direction (D1 direction), the operation lever 2A abuts the first movable member 4A. When the operation lever 2A is further tilted to the first tilting direction (D1 direction) while the operation lever 2A is in contact with the first movable member 4A, the first movable member 4A rotates about the tilting shaft 16A.

The permanent magnet 6A is supported by the frame 70 such that the permanent magnet 6A faces the first magnetic member 40A and the second magnetic member 80A in the Z direction (an example of the first direction) when the operation lever 2A is positioned at the home position H.

In the second embodiment, for example, the permanent magnet 6A is accommodated in the magnet holder 60A. The magnet holder 60A is secured to the frame 70, for example, with the non-movable member 90.

In the permanent magnet 6A, adjacent polarities are different in the Y direction (an example of the second direction). In the second embodiment, for example, the permanent magnet 6A includes the first magnet 61A and the second magnet 62A. Similar to the first magnet 61 and the second magnet 62 of the above-described first embodiment, the first magnet 61A and the second magnet 62A are arranged side by side in the Y direction such that a direction of magnetism of the first magnet 61A and a direction of magnetism of the second magnet 62A differ from each other in the Z direction. The first magnet 61A faces the first magnetic member 40A and the second magnetic member 80A in the Z direction when the operation lever 2A is positioned at the home position H, and the second magnet 62A faces the first magnetic member 40A and the second magnetic member 80A in the Z direction when the operation lever 2A is positioned at the home position H (see FIG. 12A).

The second movable member 8A includes a set of a mounting piece 82A, a second magnetic member 80A, and an engagement portion 84A, which are rotatably supported by the tilting shaft 16A. In the second embodiment, for example, the mounting piece 82A and the engagement portion 84A are formed of a resin material. In this case, the mounting piece 82A and the second magnetic member 80A may be integrally formed by insert molding. However, in an alternative embodiment, one or both of the mounting piece 82A and the engagement portion 84A may be formed of a magnetic material.

The second movable member 8A is supported by the frame 70 so as to rotate in conjunction with the tilting operation of the operation lever 2A. For example, the second movable member 8A is rotatably supported by the tilting shaft 16A of the operation lever 2A. There may be various ways of operating the second movable member 8A in conjunction with the operation lever 2A. In the second embodiment, as an example, in a state in which the first movable member 4A (the first movable member 4A rotated about the tilting shaft 16A) is in contact with the engagement portion 84A of the second movable member 8A, if the operation lever 2A is further tilted to the first tilting direction (the D1 direction), the second movable member 8A rotates about the tilting shaft 16A. However, in an alternative embodiment, the same interlocking operation may be realized by the second movable member 8A being abutted the operation lever 2A, similar to the above-described first embodiment.

The second magnetic member 80A is provided adjacent to the first magnetic member 40A in the Y direction. Specifically, the second magnetic member 80A is provided on both sides of the first magnetic member 40A in the Y direction and on the positive side of the first magnetic member 40A in the X direction (a side farther from the tilting shaft 16A). That is, the second magnetic member 80A is arranged to surround three sides of the first magnetic member 40A. The second magnetic member 80A may preferably extend in the same plane (in the XY plane) as the first magnetic member 40A from the viewpoint of making the attractive force generating mechanism 1A thinner (and downsizing of the shift device accompanied by making the attractive force generating mechanism 1A thinner) and from the viewpoint of making a flow of magnetic flux efficient (to be described below). The meaning of "in the same plane" described above may be a state in which the first magnetic member 40A is not offset from the second magnetic member 80A greater than a plate thickness in the Z direction, and it does not require that the first magnetic member 40A and the second magnetic member 80A are exactly in the same plane. However, in an alternative embodiment, the first magnetic member 40A and the second magnetic member 80A may be offset in the Z direction by the plate thickness or more.

The engagement portion 84A is provided to abut (engage with) the first movable member 4A in the Z direction when the first movable member 4A rotates around the tilting shaft 16A. Accordingly, the engagement portion 84A overlaps with the first movable member 4A when seen from the Z direction. That is, the engagement portion 84A protrudes upward from a location outside an edge (an edge located farther from the tilting shaft 16A in the X direction) of the first movable member 4A in the X direction, and extends in the X direction toward the tilting shaft 16A.

With respect to the second magnetic member 80A, edges of the second magnetic member 80A in the Y direction may be bent downward. The bent portions of the second magnetic member 80A respectively face upper portions of the side surfaces of the magnet holder 60A in the Y direction. Hereinafter, such a bent portion of the second magnetic member 80A is referred to as a "bent portion 801".

The non-movable member 90 is formed of a magnetic material. The non-movable member 90 is provided, in the Z-direction, on the opposite side of the permanent magnet 6A with respect to the first movable member 4A and the second movable member 8A, i.e., below the permanent magnet 6A. The non-movable member 90 faces the first movable member 4A and the second movable member 8A in the Z direction. The non-movable member 90 may also have side portions 91 facing, in the Y direction, lower portions of the side surfaces of the magnet holder 60A in the Y direction. The side portions 91 face the bent portions 801 of the second magnetic member 80A in the Z direction.

Next, a principle of attractive force generation (click feeling generation) by the attractive force generating mechanism 1A will be outlined. In the attractive force generating mechanism 1A, the permanent magnet 6A cooperates with the first magnetic member 40A of the first movable member 4A, the second magnetic member 80A of the second movable member 8A, and the non-movable member 90, to create a click feeling by magnetic force.

Figure 12A:
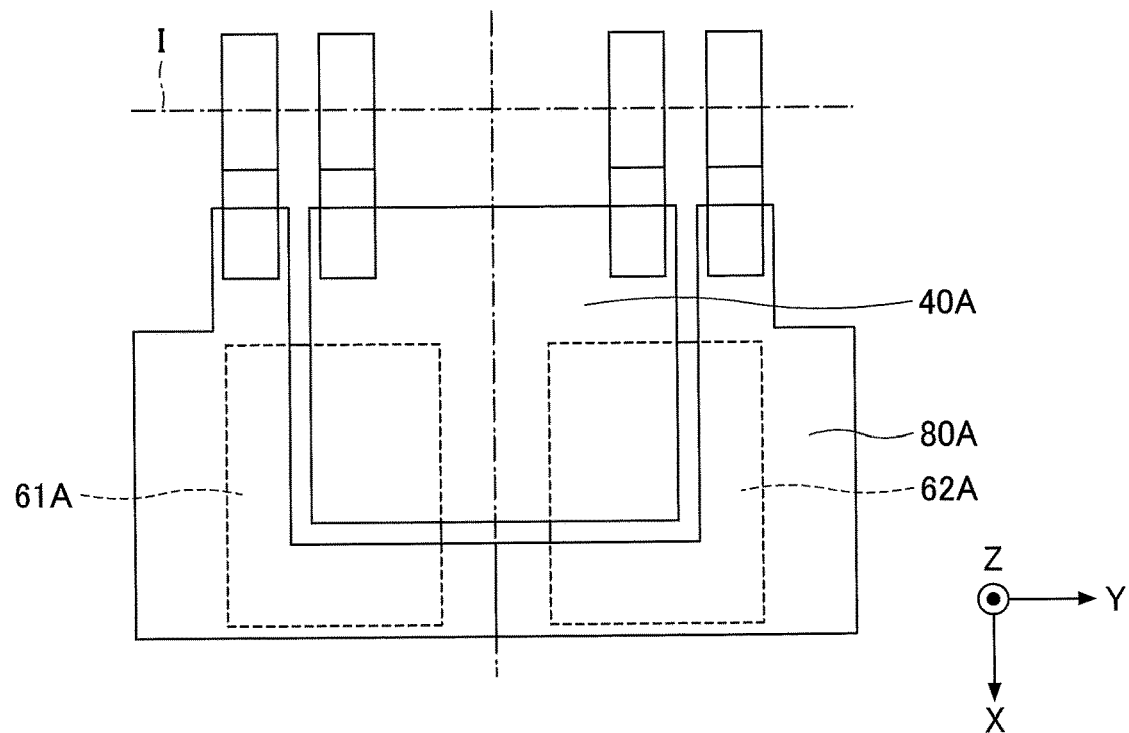
FIG. 12A is an explanatory view of a principle of attractive force generation by the attractive force generating mechanism according to the second embodiment.
Figure 12B:
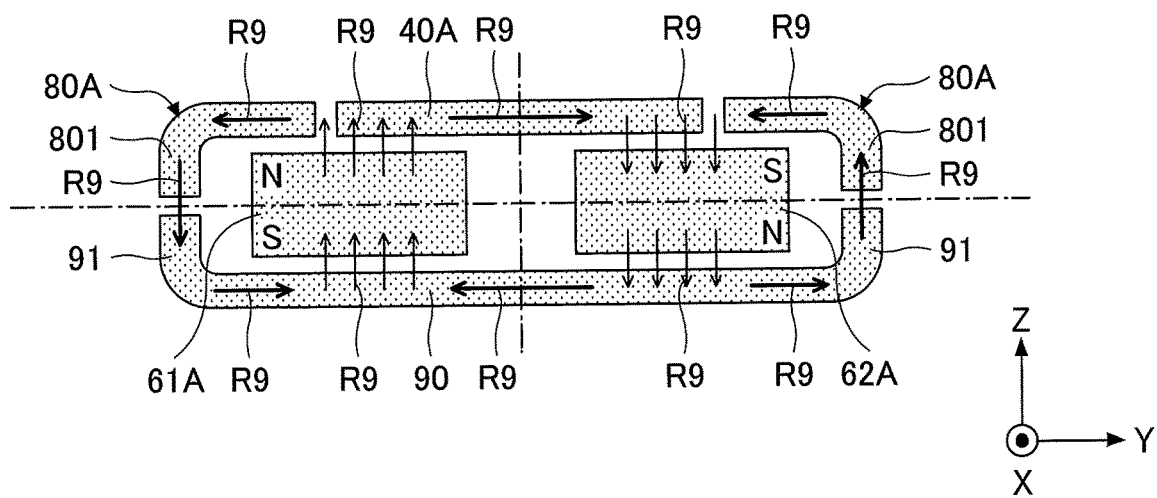
FIG. 12B is an explanatory view of the principle of attractive force generation by the attractive force generating mechanism according to the second embodiment.
Figure 12C:
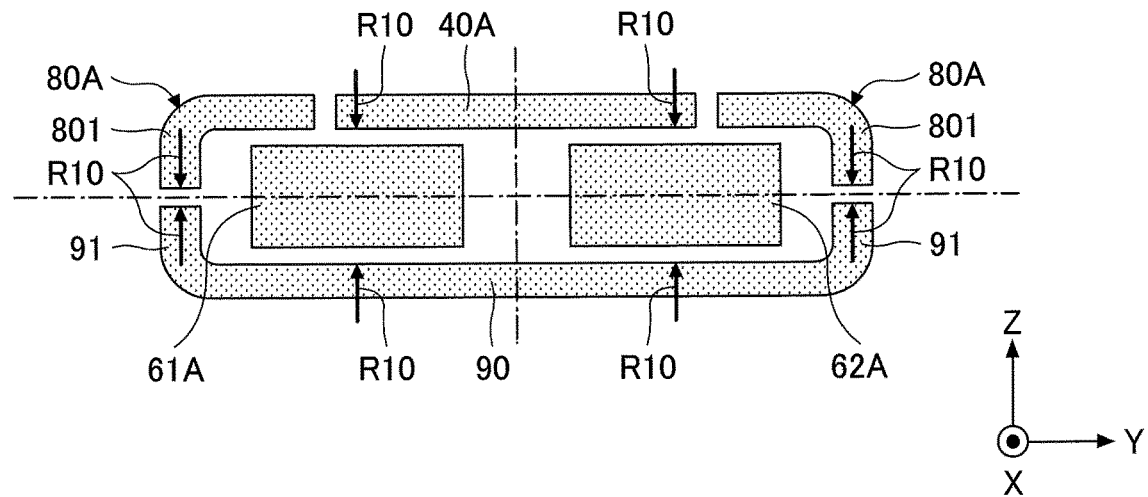
FIG. 12C is an explanatory view of the principle of attractive force generation by the attractive force generating mechanism according to the second embodiment.

FIGS. 12A to 12C are explanatory views of the principle of attractive force generation by the attractive force generating mechanism 1A. FIG. 12A is a plan view, and FIGS. 12B and 12C are cross-sectional views taken along the YZ plane passing through the first magnetic member 40A. As FIGS. 12A to 12C are explanatory views, illustration of the magnet holder 60A and the like is omitted. In FIG. 12A, an axis I of the tilting shaft 16A is schematically illustrated. Also, in FIG. 12B, a flow of magnetic flux is schematically illustrated by arrows R9, and in FIG. 12C, attractive force is schematically illustrated by arrows R10.

In FIG. 12B, for example, the upper side of the first magnet 61A is a north magnetic pole, and the upper side of the second magnet 62A is a south magnetic pole. In this case, a flow of magnetic flux occurs as indicated by the arrows R9 in FIG. 12B, and as indicated by the arrows R10 in FIG. 12C, attractive force is generated in the Z direction between the first and second magnetic members 40A and 80A and the first and second magnets 61A and 62A. Also, as illustrated in FIG. 12B, the non-movable member 90 forms a flow of magnetic flux under the first magnet 61A and the second magnet 62A, and attractive force in the Z direction is generated between the non-movable member 90 and the second magnetic member 80A. As a gap (gap in the Z direction) between the side portion 91 of the non-movable member 90 and the bent portion 801 of the second magnetic member 80A is relatively small, the flow of magnetic flux illustrated by the arrows R9 can be efficiently formed in FIG. 12B. Because the first magnetic member 40A and the second magnetic member 80A are positioned in the same plane, there is little gap (offset) in the Z direction between the first magnetic member 40A and the second magnetic member 80A, and the flow of magnetic flux indicated by the arrows R9 in FIG. 12B can be efficiently formed.

In a process in which the operation lever 2A is tilted to the first tilting direction (the D1 direction) from the home position H, when the first magnetic member 40A is rotated integrally with the first movable member 4A in a direction away from the magnet holder 60A against the attractive force from the first magnet 61A and the second magnet 62A after the upper surface 2e abuts the first movable member 4A, the first magnetic member 40A is pulled away from the first magnet 61A and the second magnet 62A, thereby generating a click feeling. Further, after the first movable member 4A abuts the engagement portion 84A of the second movable member 8A, when the second magnetic member 80A is rotated integrally with the second movable member 8A in the direction away from the magnet holder 60A against attractive force from the first and second magnets 61A and 62A and from the non-movable member 90, the second magnetic member 80A is pulled away from the first magnet 61A and the second magnet 62A, thereby generating a click feeling.

Note that the operation lever 2A, the first movable member 4A, and the second movable member 8A are configured such that the first movable member 4A abuts the engagement portion 84A of the second movable member 8A after the operation lever 2A abuts the first movable member 4A, in the process of tilting the operation lever 2A from the home position H toward the first tilting direction (D1 direction). This creates a click feeling at different tilting operation positions (two-stage click feeling in the D1 direction).

Here, even in the second embodiment, similar to the above-described first embodiment, the first magnetic member 40A and the second magnetic member 80A do not overlap in the Z direction, as illustrated in FIG. 12A. Therefore, according to the second embodiment, compared to a comparative example (not illustrated) in which the first magnetic member and the second magnetic member overlap with each other in the Z direction, the flow of magnetic flux occurring in each of the first magnetic member 40A and the second magnetic member 80A, and the area (area seen from the Z direction) facing the first magnet 61A and the second magnet 62A in each of the first magnetic member 40A and the second magnetic member 80A are clarified. As a result, a design of the attractive force becomes easier, and an individual difference can be reduced.

In the second embodiment, two magnets of the first magnet 61A and the second magnet 62A are provided, but a single magnet having the same polarity (a multipole magnet) may be used. However, in a case in which the first magnet 61A and the second magnet 62A are used, multipolarization is not required and cost can be reduced.

In the second embodiment, the engagement portion 84A is formed of resin, but the engagement portion 84A may be formed of a magnetic material as described above. In this case, the engagement portion 84A may be a part of the second magnetic member 80A, and overlaps the first magnetic member 40A in the Z-direction. That is, only a portion corresponding to the engagement portion 84A of the second magnetic member 80A overlaps with the first magnetic member 40A seen from the Z direction. However, even in this case, as the second magnetic member 80A does not substantially overlap with the first magnetic member 40A when viewed from the Z direction, and the area directly facing the first magnet 61A and the second magnet 62A in each of the first magnetic member 40A and the second magnetic member 80A does not substantially change, the same effect as that in a case in which the engagement portion 84A is formed of resin can be obtained.

Next, a variation of the above-described second embodiment will be described with reference to FIGS. 13A to 13C. In the following description of the variation, with respect to components that may be the same as those in the above-described first embodiment, the same reference numerals are attached, and descriptions of the components are omitted.

Figure 13A:
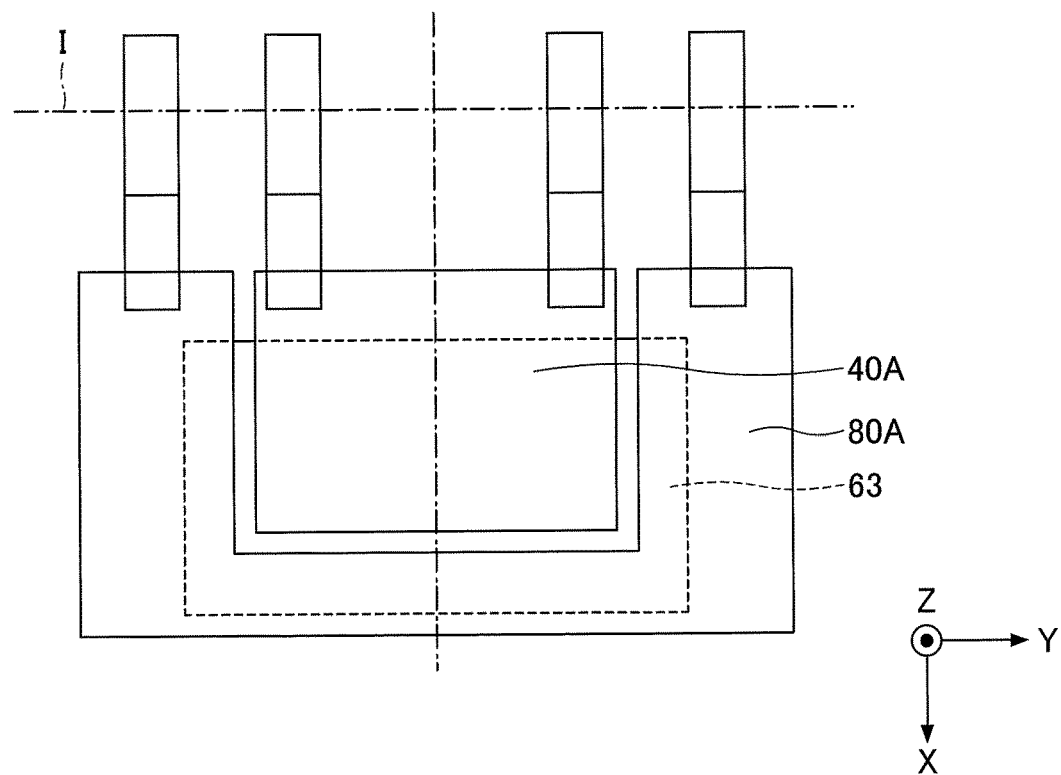
FIG. 13A is an explanatory view of a principle of attractive force generation by an attractive force generating mechanism according to a variation of the second embodiment.
Figure 13B:
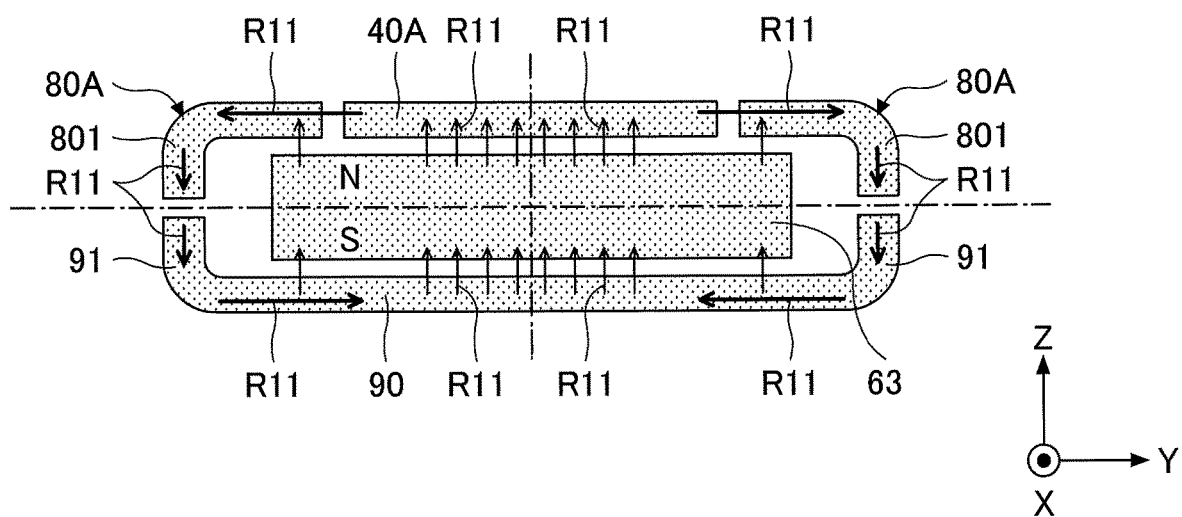
FIG. 13B is an explanatory view of the principle of attractive force generation by the attractive force generating mechanism according to the variation of the second embodiment.
Figure 13C:
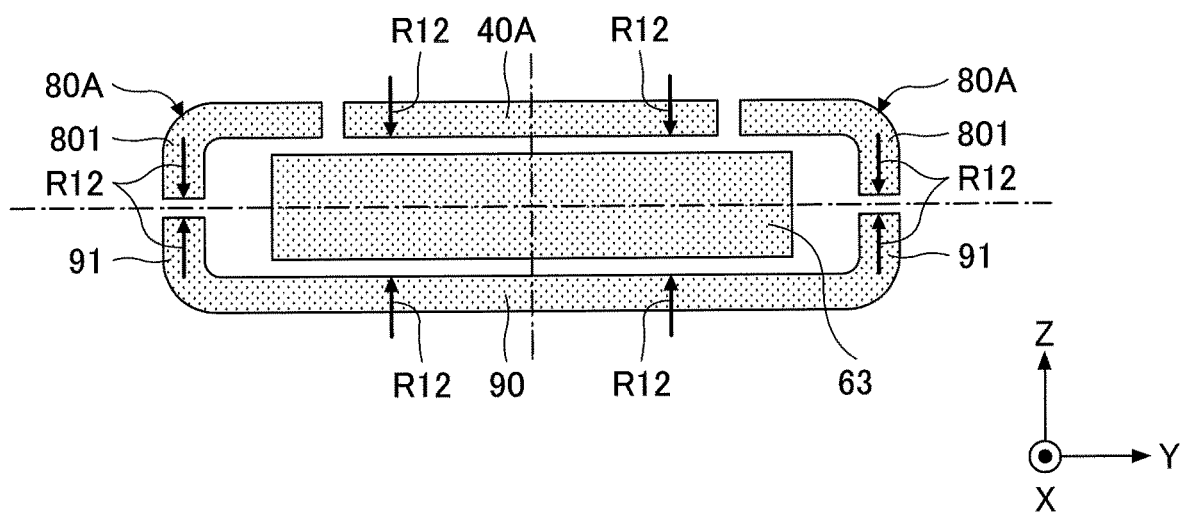
FIG. 13C is an explanatory view of the principle of attractive force generation by the attractive force generating mechanism according to the variation of the second embodiment.

FIGS. 13A to 13C are explanatory views of a principle of attractive force generation according to the variation. FIG. 13A is a plan view, and FIGS. 13B and 13C are cross-sectional views taken along the YZ plane passing through the first magnetic member 40A. As FIGS. 13A to 13C are explanatory figures, illustration of a magnet holder and the like is omitted. In FIG. 13A, an axis I of the tilting shaft 16A is schematically illustrated. Also, in FIG. 13B, a flow of magnetic flux is schematically illustrated by arrows R11, and in FIG. 13C, attractive force is schematically illustrated by arrows R12.

In the above-described second embodiment, two magnets of the first magnet 61A and the second magnet 62A are provided. In this variation, a magnet 63 is provided instead of the first magnet 61A and the second magnet 62A. As illustrated in FIG. 13A, the magnet 63 faces the first magnetic member 40A and the second magnetic member 80A seen from the Z direction, in a state in which the operation lever 2A is positioned in the home position H.

In FIG. 13B, for example, the upper side of the magnet 63 is a north magnetic pole. In this case, a flow of magnetic flux occurs as indicated by the arrows R11 in FIG. 13B. As a result, as indicated by the arrows R12 in FIG. 13C, attractive force in the Z direction is generated between the first and second magnetic members 40A and 80A and the magnet 63, and attractive force in the Z direction is generated between the second magnetic member 80A and the non-movable member 90. Thus, also according to the present variation, a click feeling is generated in a similar principle as that of the above-described second embodiment.

According to the above-described embodiments of the present disclosure, a compact and durable operating device can be realized. Although each embodiment has been described in detail above, it is not intended to be limited to any particular embodiment, and various modifications and variations may be made within the scope of the claims. It is also possible to combine all or some of the components of the above-described embodiments.

For example, in the first embodiment described above, the tilting shaft 16 is rotatably supported by the case body 110, but is not limited thereto. For example, as in the above-described second embodiment, the tilting shaft 16 may be rotatably supported by the frame (another example of a support body). In this case, the frame may be supported by the case body 110 such that the frame can revolve about an axis parallel to the X direction.

What is claimed is:

1. An operating device comprising:
an operation member that can be tilted from an operation reference position;
a support body supporting the operation member such that the operation member can be tilted;
a first movable member supported by the support body so as to rotate in conjunction with a tilting operation of the operation member;
a second movable member supported by the support body so as to rotate in conjunction with the tilting operation of the operation member;
a first magnetic member formed of a magnetic material and provided to the first movable member;
a second magnetic body formed of a magnetic material and provided to the second movable member; and
a permanent magnet supported by the support body so as to face the first magnetic member and the second magnetic member in a first direction in a state in which the operation member is positioned at the operation reference position; wherein
the first magnetic member and the second magnetic member do not overlap with each other seen from the first direction.

2. The operating device according to claim 1, wherein the first magnetic member and the second magnetic member extend in a same plane in an area in which the first magnetic member and the second magnetic member face the permanent magnet in the first direction.

3. The operating device according to claim 1, wherein the permanent magnet is disposed such that different magnetic poles in the permanent magnet are arranged side by side in a second direction intersecting the first direction.

4. The operating device according to claim 3, wherein
the permanent magnet includes a first magnet and a second magnet; and
the first magnet and the second magnet are arranged side by side in the second direction, such that a direction of magnetism of the first magnet is different from a direction of magnetism of the second magnet in the first direction.

5. The operating apparatus according to claim 1, further comprising a non-movable member formed of a magnetic material and that is supported by the support body, the non-movable member being provided on an opposite side of the permanent magnet with respect to the first magnetic member and the second magnetic member in the first direction.

6. The operating device according to claim 1, wherein the first movable member, the second movable member, the first magnetic member, and the second magnetic member are provided on each side of the permanent magnet in the first direction.

* * * * *